United States Patent Office 3,369,900
Patented Feb. 20, 1968

3,369,900
MICROSCOPIC CAPSULES AND METHOD OF
MAKING THE SAME
Lloyd D. Taylor, Everett, Mass., assignor to Polaroid
Corporation, Cambridge, Mass., a corporation of
Delaware
No Drawing. Filed Mar. 25, 1963, Ser. No. 267,838
2 Claims. (Cl. 96—76)

This invention relates to microscopic pressure-rupturable capsules of hydrophilic colloid material and to a method of making them by coacervation.

Methods of preparation of microscopic pressure-rupturable capsules containing a water immiscible medium are well known to the art. Generally, such capsules are formed by deposition of a complex colloid material around microscopic droplets of a water-immiscible medium by a process of causing coacervation, by dilution or adjustment of the pH, to occur in a mixture of two different colloid salts in which the water-immiscible material droplets are dispersed, and then gelling the complex colloid. Generally the complex colloid material is formed of an aqueous solution of one colloid, emulsifying the nuclei material therein and mixing the thus-formed emulsion with an aqueous salt of another colloid, or the two sols may be made and mixed and the water-immiscible solvent emulsified therein. The coacervation is brought about by dilution and/or by adjusting the pH of the mixture. The gellable colloid materials used in the sols must be ionizable and the art has taught that the sols must exist in the mixture with opposite electric charges.

It has now been found that it is not necessary to provide a mixture of two colloid materials of opposite electric charges in order to carry out the preparation of capsules of coacervation. By means of this invention, encapsulation of a water-immiscible solvent as the nuclei material may be achieved utilizing a single, negative colloid material.

Accordingly, one object of this invention is to provide a method for encapsulating nuclei material by coacervation utilizing a single hydrophilic colloid.

Another object of this invention is to provide microscopic capsules wherein the walls comprise a single hydrophilic colloid.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The novel process of this invention is useful in encapsulating water-immiscible materials such as oil or organic solvents. Droplets of the water-immiscible phase constitute the nuclei or internal phase of the capsule around which the single hydrophilic colloid is deposited.

In carrying out the novel process of this invention, a solution of a negative hydrophilic colloid is prepared and, with constant stirring throughout, the temperature and pH of the system is adjusted to a level above the point at which the colloid will floc or precipitate out. A coacervate of the colloid is formed at this point which may be referred to as the "cloud point." The term "cloud point" will be defined in more detail below. The water-immiscible internal phase is then added to the coacervate mixture and colloid starts to form at the interface of the droplets and the aqueous solution forming a wall around each droplet. Capsule formation is then accelerated by lowering the temperature slowly. The gradual temperature drop also hardens, to some degree, the walls of colloid deposited around the droplets of internal phase. The capsules may then be hardened by the appropriate means, for example, rapid cooling and/or the addition of a hardening agent such as glutaraldehyde. The hardened capsules may then be isolated and dried and utilized in an appropriate manner. Alternatively, the internal phase may be added prior to bringing the solution to the cloud point. The point in the process at which the internal phase is added is not critical. When the internal phase is added prior to adjusting the colloid solution to the cloud point, the progress of capsule formation may be observed microscopically as the pH and temperature are adjusted.

Negative hydrophilic colloids suitable for use in the present invention are gelatin derivatives which are coagulable in an aqueous acidic medium, preferably at a pH of about 5 or lower. The aforementioned gelatin derivatives have an excess of carboxylic acid groups over amino groups and may be prepared by reacting gelatin with a material which will add to the gelatin through the amine groups on the gelatin. Such gelatin derivatives generally exhibit a lower isoelectric point than that of underivatized gelatin.

Gelatin derivatives, for use within the scope of this invention, may be prepared by reacting gelatin with an aromatic sulfonyl chloride, a carboxylic acid chloride, an aromatic isocyanate or a dicarboxylic acid anhydride. The preparation of such gelatin derivatives is well known to the art. For example, suitable gelatin derivatives are disclosed in U.S. Patent No. 2,614,928.

A preferred negative hydrophilic colloid suitable for use in the single-system encapsulation process of this invention is a gelatin derivative which is the product of the reaction of a dicarboxylic acid anhydride with gelatin in an aqueous medium. As examples of suitable anhydrides which may be reacted with gelatin to form gelatin derivatives for use in this invention, mention may be made of phthalic anhydride, tri-mellitic anhydride, succinic anhydride, and glutaric anhydride. It should be noted that the dicarboxylic acid anhydrides suitable for use in this invention may have other carboxylic acid groups as well as those which go to make up the anhydride groups. The type of gelatin which is reacted with the dicarboxylic acid anhydride is not critical, e.g., high or low isoelectric point gelatin may be used. It should be noted, however, that certain anhydrides are known which will cross-link gelatin. Therefore, these materials should be avoided when selecting anhydrides to derivatize gelatin for the novel process of this invention. The reaction of dicarboxylic acid anhydrides with gelatin to form the anhydride derivative of gelatin is known to the art. The gelatin derivatives useful in the present invention are prepared according to the procedure set forth in U.S. Patent No. 2,525,753.

The following nonlimiting example illustrates the preparation of a gelatin derivative suitable for use in the present invention.

*Example 1*

A phthalic anhydride derivative of gelatin was prepared by dissolving 100 gm. of gelatin in 1100 cc. of water at a temperature of 40° C. The pH of the resultant solution was adjusted, to within the range of 9.5 to 10.5, with aqueous 10% sodium hydroxide solution. 11 gm. of phthalic anhydride, dissolved in 77 cc. of dry acetone, was then added gradually over a 30 minute period, during which addition the solution pH was maintained within the previously denoted range, by the addition of aqueous 10% sodium hydroxide solution. The reaction was maintained for 30 minutes, at a temperature of 40° C., after which the pH was lowered to within the range of 6 to 7, with an aqueous 10% sulfuric acid solution. The mixture was then gelled and set.

The following nonlimiting examples illustrate the preparation of capsules within the scope of the present invention.

*Example 2*

150 ml. of an 8% aqueous solution of the reaction product of tri-mellitic anhydride and gelatin was added to 500 ml. of water at 50° C. with constant, low speed stirring. The pH of the solution was adjusted to 3.6 with 6 N hydrochloric acid. 100 ml. of toluene was added to the solution through a dropping funnel whose tip was partially immersed in the solution. The solution was cooled slowly to 25° while stirring was continued. The solution was then placed in a Dry Ice-acetone bath to cool the solution rapidly to 10° C. The capsules were then hardened by the addition of 5 ml. of glutaraldehyde. The solution was allowed to stand at room temperature overnight and then the hardened capsules, about 40 to 50 microns in diameter, were isolated and dried.

*Example 3*

250 ml. of an 8% aqueous solution of the reaction product of phthalic anhydride and gelatin was added with stirring to 700 ml. of water at 40° C. Acetic acid was added to lower the pH of the solution to 4.3. With continuing stirring, 135 ml. of toluene was added to the solution by means of a dropping funnel whose tip was partially immersed in the solution. The system was then cooled slowly to 25° C. and then cooled rapidly to 10° C., by immersion in a Dry Ice-acetone bath. 10 ml. of glutaraldehyde was then added to the solution with stirring and the solution allowed to sit at room temperature overnight. The hardened capsules, about 40 to 50 microns in size, were then isolated and dried.

*Example 4*

250 ml. of an 8% aqueous solution of the reaction product of phthalic anhydride and gelatin was added with stirring to 700 ml. of water at 40° C. Acetic acid was added to the solution to lower the pH to 4.3. With continued stirring, toluene (200 ml.) was added. The temperature of the system was then lowered slowly to 25° C. and then rapidly to 10° C. 10 ml. of glutaraldehyde was then added to the system which was then allowed to stand at room temperature overnight. The hardened capsules, about 40 to 50 microns in size, were then isolated and dried.

*Example 5*

100 ml. of a 10% solution of the reaction product of gelatin and benzene sulfonyl chloride was added to 500 ml. of water at a temperature of 45° C. The pH of the solution was adjusted to 5.3 with acetic acid. With continued stirring, 100 ml. of toluene was added. The temperature was then lowered slowly to 25° C. and then rapidly to 10° C. 10 ml. of glutaraldehyde was then added. The hardened capsules were then isolated and dried.

It should be noted that the problem of preparing capsules by coacervation, whose walls comprise a single colloid, has been solved by unobvious and unexpected means in that it has been generally believed that at least two colloids, preferably a positive and a negative colloid, are necessary for capsule formation by coacervation.

In carrying out the novel process of this invention, the temperature and pH of the colloid solution is adjusted to a point above the melting point of the colloid, but where polymer is beginning to form as a sol, suspended in the solution. The colloid solution is then said to have reached the "cloud point." The cloud point is both temperature and pH dependent. The cloud point for each gelatin derivative may be determined visually initially, after which subsequent capsule preparations may be made without the necessity of visual observation by bringing the particular colloid system to the visually predetermined temperature and pH. As stated above, if the internal phase is added to the solution prior to adjusting the solution to the cloud point, the progress of capsular formation may be observed microscopically as the temperature is lowered.

It should be noted that, in the preparation of the novel capsules of this invention, as the encapsulation is occuring there may be some formation of precipitating polymer as well as that which is depositing around the droplets of internal phase. This phenomenon is believed to be the result of an excess of colloid in relation to the water-immiscible phase. It has been found that when such a situation occurs the amount of precipitated polymer can be decreased and the amount of capsule increased by raising the temperature of the system to dissolve the precipitated polymer and then cooling again to about 25° C. This may be repeated several times in order to reduce to a minimum the amount of precipitated polymer mass. It should be noted further that in the process of decreasing the volume of precipitated polymer the capsules that have been formed do not decoacervate nor are they affected in any other manner. If the temperature is raised to a point where the capsules dissolve, they may be reconstituted once again by cooling the system to the cloud point. The problem of precipitated polymer mass can also be minimized by increasing the ratio of internal phase to colloid.

In preparing capsules by the novel process of this invention, the stirring action given the colloid system is determinative of the size of the droplets of water-immiscible phase and ultimately the size of the capsules. The more vigorous the stirring action, the smaller the size of the droplet. For example, capsules about 1 to 10 microns in size may be prepared using the stirring action of a Waring Blendor. Larger size capsules may be prepared by less vigorous stirring action. Capsules prepared by the novel process of this invention are in the 1 to 100 micron range.

The ratio of colloid to internal phase may range from 4 to 1 to 20 to 1, by weight. This ratio is a function of particule size, with less colloid required for large droplets of internal phase.

Minute capsules may also be prepared by the novel process of this invention wherein the capsule wall contains photosensitive silver halide. Such capsules may be prepared by using, as a single negative colloid, a photosensitive silver halide emulsion prepared using a gelatin derivative which is suitable for use in single colloid capsules within the scope of this invention. As examples of such emulsions which comprise the above-described gelatin derivatives, mention may be made of the photosensitive gelatin-silver halide emulsions described in U.S. Patents No. 2,614,928 and No. 2,614,929.

The copending application of Lloyd D. Taylor, Ser. No. 267,847, filed Mar. 25, 1963, discloses and claims minute capsules containing photosensitive silver halide in the capsule wall, wherein the capsule wall is formed by coacervation of two negative colloids.

Novel capsules prepared for the process of the present invention may be used in printing or reproduction processes. For example, a dye or printing oil may be incorporated in the internal phase prior to coacervation and a layer of the capsules coated on a sheet of paper. By the application of pressure in a particular pattern, the capsules will rupture liberating the dye or marking material thus reproducing the original pressure pattern on the paper.

Since certain changes may be made in the above product and process without departing from the scope of the invention herein involved, it is intended that all matter contained in the above description shall be interpreted as illustrative and not in a limiting sense.

What is claimed is:

1. A process of preparing microscopic capsules which comprises, in combination, the steps of providing an aqueous solution of an acid-coagulable, negative hydrophilic colloid containing photosensitive silver halide, adjusting the pH and temperature of said aqueous solution to the cloud point thereof whereby to provide a coacervate consisting essentially of said colloid containing said photosensitive silver halide, adding a water-immiscible medium to said aqueous solution to thereby provide a dispersion of droplets comprising said water-immiscible medium whereby said coacervate deposits around individual droplets of said water-immiscible medium individually encapsulating said droplets, and gelling the encapsulated coacervate by cooling.

2. Microscopic capsules comprising a substantially continuous polymeric layer surrounding a nucleus comprising a water-immiscible medium, said polymeric layer consisting essentially of an acid-coagulable, negative hydrophilic colloid containing photosensitive silver halide, said capsules prepared by providing an aqueous solution of said colloid, adjusting the pH and temperature of said solution to the cloud point thereof whereby to provide a coacervate consisting essentially of said colloid containing said photosensitive silver halide, adding a water-immiscible medium to said solution whereby to provide a dispersion of droplets comprising said water-immiscible medium whereby said coacervate deposits around individual droplets of said water-immiscible medium individually encapsulating said droplets, gelling said capsules by cooling, and separating said capsules from the remainder of the mixture.

References Cited

UNITED STATES PATENTS

| 2,763,552 | 9/1956 | Van Campen et al. | 96—98 |
| 2,800,458 | 7/1957 | Green | 252—316 |
| 2,852,382 | 9/1958 | Illingsworth et al. | 96—98 |
| 3,069,370 | 12/1962 | Jensen et al. | 167—83 X |
| 3,190,837 | 7/1965 | Brynko et al. | 252—316 |

FOREIGN PATENTS 875,763   10/1961   Great Britain.

NORMAN G. TORCHIN, *Primary Examiner.*

DONALD LEVY, *Examiner.*

J. P. BRAMMER, *Assistant Examiner.*